United States Patent
Gründl et al.

(10) Patent No.: US 7,476,997 B2
(45) Date of Patent: Jan. 13, 2009

(54) TRAVELLING FIELD MACHINE

(75) Inventors: Andreas Gründl, München (DE); Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 250 days.

(21) Appl. No.: 10/561,894

(22) PCT Filed: Jun. 30, 2004

(86) PCT No.: PCT/EP2004/007112

§ 371 (c)(1), (2), (4) Date: Nov. 2, 2006

(87) PCT Pub. No.: WO2005/004308

PCT Pub. Date: Jan. 13, 2005

(65) Prior Publication Data
US 2007/0052315 A1 Mar. 8, 2007

(30) Foreign Application Priority Data
Jul. 1, 2003 (DE) .................. 103 29 641

(51) Int. Cl.
*H02K 1/00* (2006.01)
(52) U.S. Cl. ............ 310/179; 310/201; 310/202; 310/208
(58) Field of Classification Search ............ 310/179, 310/198, 184, 201–202, 207–208, 216–218
See application file for complete search history.

(56) References Cited

U.S. PATENT DOCUMENTS

| | | | | | |
|---|---|---|---|---|---|
| 3,761,754 | A * | 9/1973 | Boesel | ............ | 310/218 |
| 3,885,302 | A * | 5/1975 | Boesel | ............ | 29/596 |
| 4,329,609 | A * | 5/1982 | Allegre et al. | ............ | 310/183 |
| 5,332,939 | A * | 7/1994 | Fanning et al. | ............ | 310/71 |
| 6,838,790 | B2 * | 1/2005 | Arimitsu et al. | ............ | 310/43 |
| 2002/0053853 | A1 * | 5/2002 | Nishimura | ............ | 310/201 |
| 2004/0232779 | A1 * | 11/2004 | Arimitsu et al. | ............ | 310/43 |
| 2005/0236921 | A1 * | 10/2005 | Yoneda et al. | ............ | 310/179 |
| 2005/0248228 | A1 * | 11/2005 | Yoneda et al. | ............ | 310/179 |

FOREIGN PATENT DOCUMENTS

| | | |
|---|---|---|
| DE | 527149 | 5/1931 |
| DE | 596449 | 4/1934 |
| DE | 101 43 217 C 1 | 9/2001 |
| EP | 1 039 616 A2 | 2/2000 |
| GB | 1281691 | 7/1969 |
| JP | 2001 275288 A | 10/2001 |

\* cited by examiner

*Primary Examiner*—Thanh Lam
(74) *Attorney, Agent, or Firm*—John A. Miller; Miller IP Group, PLC

(57) ABSTRACT

A travelling field machine with a stator and a rotor which are separated by an air gap and each of which comprises at least one stator coil or one rotor coil, with the stator or the rotor, respectively, comprising a soft magnetic iron body with a stator or rotor back, in which spaced grooves are formed, generating teeth, and in each of the grooves several conductor bars of the stator coil or the rotor coil, respectively, are arranged in series comprising end connectors arranged at the faces of the stator or the rotor, respectively, which connect the conductor bars extending across at least one groove, with the conductor bars comprising conductor portions of different length projecting beyond the faces of the stator or rotor, respectively, and the end connectors being arranged in a stacked fashion in the axial direction at the faces of the stator or the rotor.

Figure 1:
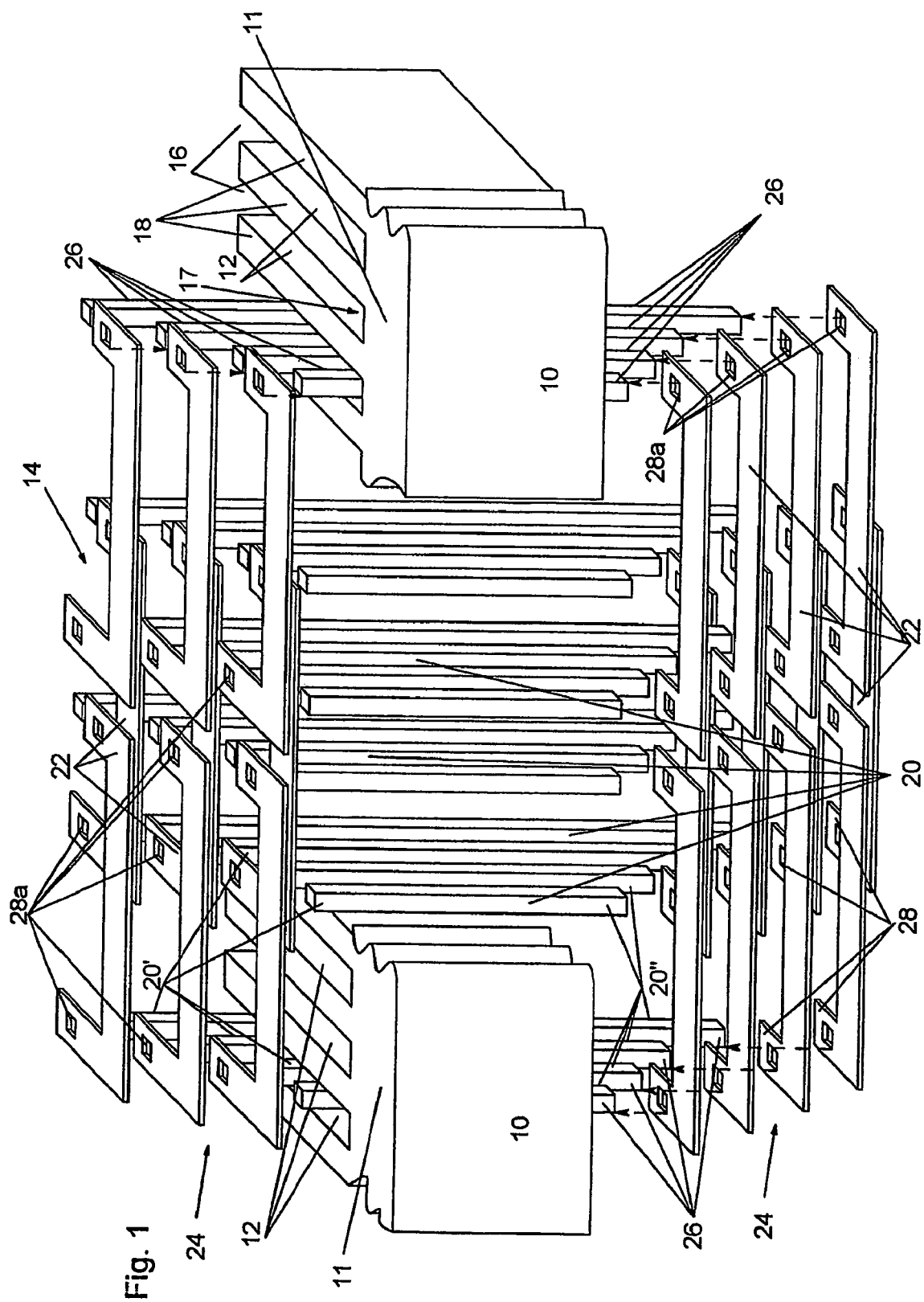

20 Claims, 3 Drawing Sheets

# TRAVELLING FIELD MACHINE

This application is a National Stage of International Application No. PCT/EP2004/007112, filed Jun. 30, 2004, which claims the priority of German Patent Application Ser. No. DE 103 29 641.7, filed Jul. 1, 2003.

BACKGROUND OF THE INVENTION

1. Field of the Invention

The present invention relates to a travelling field machine. In particular, the invention relates to a travelling field machine with a stator and a rotor, each of which comprising at least one stator coil or one rotor coil, respectively, with the stator or the rotor, respectively, comprising a soft magnetic iron body with a stator or rotor back, respectively, at which spaced grooves are formed under the forming of teeth.

2. Definition of Terms

The term "travelling field machines", i. e. asynchronous, synchronous, reluctance machines, permanently excited electrical machines, etc. covers motors as well as generators, whereby it is of no significance in particular for the invention whether such a machine is designed as a rotating machine or, for example, as a linear motor. Moreover, the invention may be applied both to internal rotor machines and external rotor machines.

In the reduction of the volume of highly efficient electrical machines the form of construction and the arrangement of the conductors of the field windings play a decisive role. Conductors with a minimum length in the winding overhangs at a high utilisation of the space reduce the ohmic losses and increase the power density.

Due to the fact that the ohmic losses in the control circuit and in the (stator) winding are proportional to the current to be connected, a certain conductor length has to be provided in the magnetic field in order to generate an induced back voltage corresponding to the desired high control voltage in a conductor arrangement of a resistance as low as possible.

Conventional electrical machines in their majority are wound with continuous wires—mostly with round cross-section. Though a thin flexible wire may easily be placed into the grooves, it has the disadvantage of a poor space utilisation in the grooves and winding overhangs. Wires with round cross-section cannot fully utilise the cross-sectional area of the groove. The space in the winding overhangs is thus also utilised only inadequately, and the magnetically ineffective conductor length, the overall weight, the required space, and the ohmic losses increase.

STATE OF THE ART

From EP 1 039 616 A2 (Honda Giken) a travelling field machine is known whose stator carries a stator coil. The stator has a soft magnetic iron body with a stator back in which spaced grooves are formed, generating teeth. Each stator coil has a conductor bar each arranged in one of the grooves and end connectors arranged at the faces of the stator, which connect the conductor bars. All of the conductor bars have the same axial length. The end connectors of the stator coils are arranged in one layer at the faces of the stator transversely to the groove bottom. The end connectors are designed as symmetrical parts and project above the groove bottom alternately towards the stator back and the air gap of the travelling field machine. The end connectors and the conductor bars are riveted together.

From JP 2001 275288 (Matsushita Electric Ind. Co., Ltd.) a travelling field machine is known whose stator comprises a stator back in which spaced grooves are formed. Conductor bars are arranged in the grooves of the stator back, and the projecting portions of the conductor bars are connected with stacked end connectors. Each phase has a different conductor bar length which corresponds to a certain end winding and certain conductor portions in the grooves. Consequently, the conductor bars in one groove have the same length, and each end winding plate comprises lines which connect the conductor portions of this phase. These lines have to be routed around the other neighbouring conductor bars.

Problem on Which the Invention is Based

The above explained known arrangements suffer from the drawback that they meet the requirements with respect to power density and reliability only partially, as are specified for some applications.

The design of the overhangs is a decisive factor for the efficiency of the electrical machine, with the known configurations being not optimised for highly efficient machines with respect to the requirements imposed by large-scale production. Moreover, the design as described e. g. in EP 1 039 616 A2 does not allow the use of multi-layer windings, because this would result in a collision of the end connectors.

Inventive Solution

For the solution of these problems the invention teaches a travelling field machine of the above mentioned type with a stator and a rotor which are separated by an air gap and each of which comprises at least one stator coil or one rotor coil, respectively, with the stator or the rotor, respectively, comprising a soft magnetic iron body with a stator or rotor back, respectively, in which spaced grooves are formed, generating teeth, and in each of the grooves several conductor bars of the stator coil or the rotor coil, respectively, are arranged in series comprising end connectors arranged at the faces of the stator or the rotor, respectively, which connect the conductor bars extending across at least one groove, wherein the conductor bars arranged in a neighbouring relationship in each of the grooves, comprising conductor portions of different length projecting beyond the faces of the stator or rotor, respectively, and the end connectors are at least partially arranged layered in tiers in the axial direction at the faces of the stator or the rotor, respectively.

This design permits a maximum utilisation of the available space (both in the axial and the radial or lateral, respectively, direction) and at the same time a power optimisation of the electrical machine with a very high reliability in operation with low manufacturing costs.

EMBODIMENTS AND DEVELOPMENTS OF THE INVENTION

Preferably, the end connectors are provided with transverse portions at their two end areas, through which they are connected with the ends of the conductor bars. The length of the transverse portions determine how far the winding overhangs originating from the conductor bars extend across the back of the rotor or the stator.

The conductor bars may have a connecting area each at their ends, which matches with corresponding portions at the end connectors for a mechanical and electrical connection. The design of the mechanical and electrical connection may be of various kinds. The connecting areas at the ends of the conductor bars or the transverse portions of the end connectors, respectively, are formed, for example, by recesses or tapers in which or to which, respectively, the corresponding portions of the end connectors or the conductor bars, respectively, are joined and contacted by laser welding or electro-impulse welding.

The joint between the end portion of the conductor bar and the end portion of the end winding may also—irrespective of the structural design of the end portion of the conductor bar and the end portion of the end winding—comprise a layer of brazing solder, preferably silver brazing solder, tin brazing older, or the like, or the connection between the end portion of the conductor bar and the end portion of the end winding has a layer of a high temperature soft solder, preferably with a melting point of at least approx. 380° C.

The transverse portions at the two end portions of the end connectors to the respective ends of the conductor bars may have different lengths and/or may be angled under different angles.

Depending on whether the electrical machine is an internal rotor or an external rotor machine, the grooves may taper or expand towards the air gap between the stator and the rotor. This allows the conductor bars arranged in the grooves, depending on their position in the groove, to have a width which is at least partially adapted to the groove width. This provides for the maximum utilisation of the available groove space.

A good space utilisation may also be achieved in that at least on one of the two faces of the stator the end connectors are not only arranged in the direction of the stator back, but also in the direction of the air gap between the stator and the rotor. In this case, the length of the conductor bars is increasing both from the stator back and the air gap between stator and rotor towards the centre of the winding chamber.

Preferably, the conductor bars and/or the end connectors are provided with a ceramic or enamel coating. In this case, it is advantageous to join the two parts to essentially L-shaped components, to provide them with a ceramic or enamel coating prior to joining or subsequently, to then insert them in layers (from both faces) into the grooves of the soft magnetic body, and to the connect them with the respective windings.

Further characteristics, properties, advantages, and possible modifications will become apparent for those with skill in the art from the following description in which reference is made to the accompanying drawing.

FIG. 1 illustrates a schematic perspective exploded view of a stator for an electrical machine according to the invention.

Figure 2:
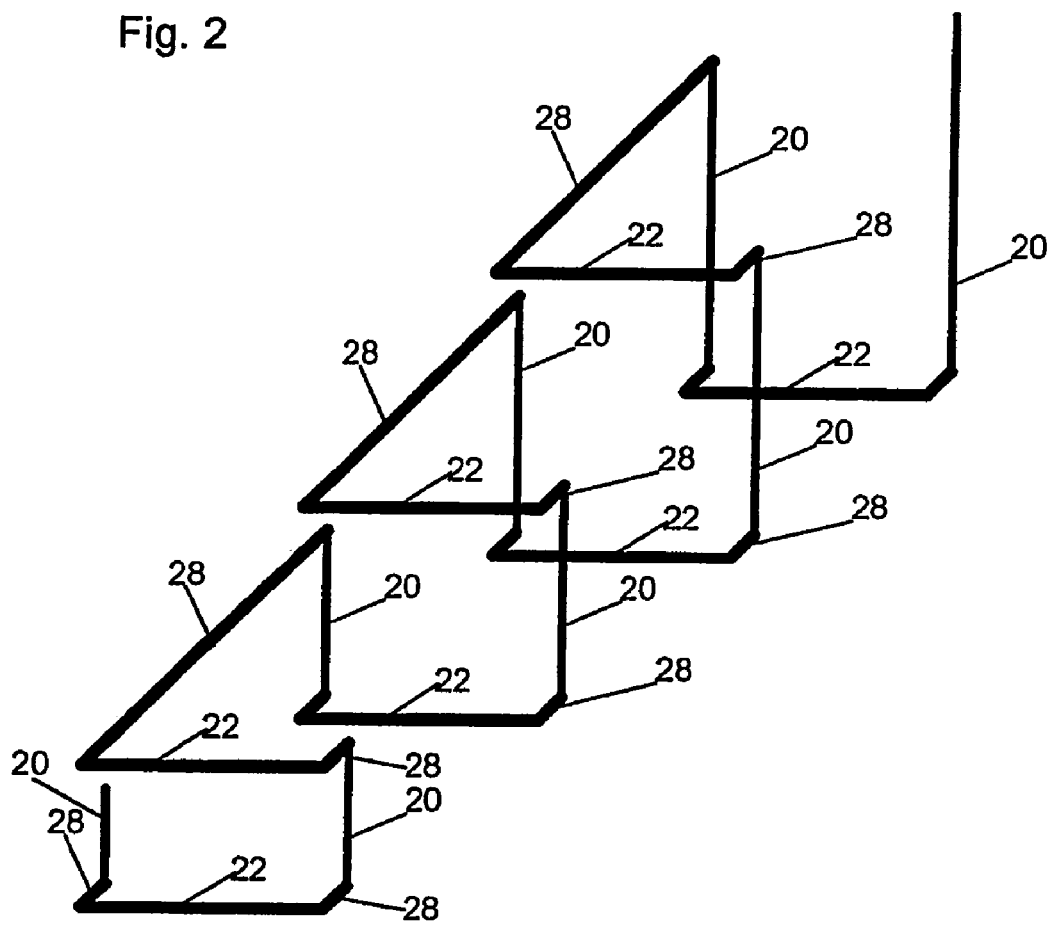

FIG. 2 schematically illustrates the construction of a winding of an electrical machine according to FIG. 1.

Figure 3A:
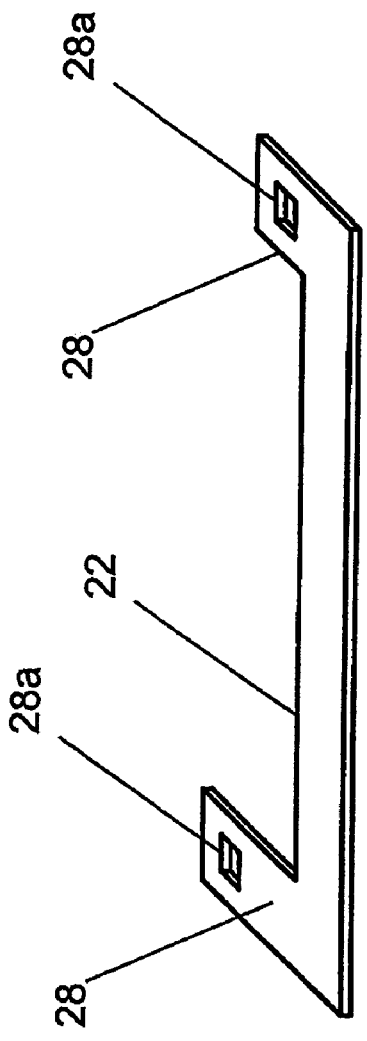
Figure 3B:
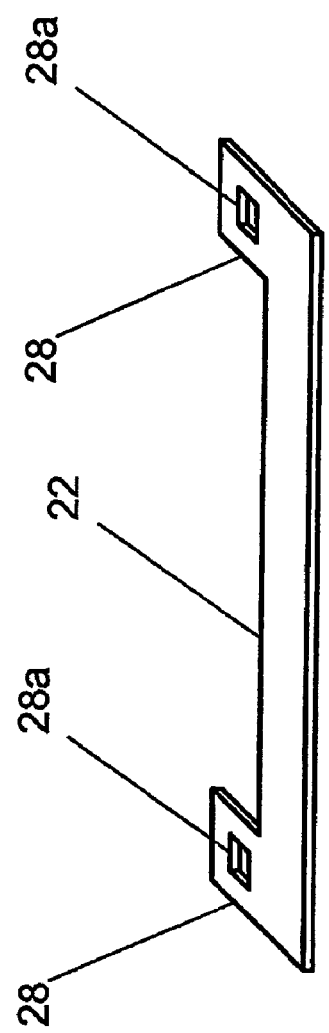

FIGS. 3a, 3b show the end connectors of the electrical machine according to FIG. 1 in an enlarged illustration.

DETAILED DESCRIPTION OF PREFERRED EMBODIMENTS

FIG. 1 is a plan view of two discontinuous portions of an unwind (development) of a stator 10 of an internal rotor machine (not shown in detail), with the invention being also applicable to an external rotor machine. In the present embodiment, the stator 10 is built from stacked sheets (not shown in detail), but could also consist of iron particles which are pressed and sintered to the respective shape.

The stator 10 with a stator back 11 has grooves 12 arranged next to one another, which form winding chambers for the respective stator coil windings 14. In the shown embodiment the winding chambers 12 have an essentially rectangular cross-section, with slots 16 in the side (not shown) facing towards the rotor. Thus, one tooth 18 each is formed between two slots 16 each.

Each stator coil 14 is formed by conductor bars 20 with an essentially rectangular cross-section, which are inserted in the winding chambers 12 and joined by end connectors 22. The end connectors 22 of all windings together form winding overhangs 24 at both faces of the stator 10. For the sake of clarity, several stator coils 14 have been omitted, and the stator 10 is shown in two discontinuous portions.

The end connectors 22 are oriented essentially in a transverse direction to the bottom 17 of the grooves 16—relative to the longitudinal axis of the conductor bars 20—and partially protrude the bottom 17 of the grooves 16 towards the stator back 11. The end connectors 22 have an essentially parallel orientation with respect to the face of the stator 10 or the rotor, respectively.

The end connectors 22 are joined at one or both of their end portions with the ends 26 of the conductor bars 20 by means of transverse portions 28 which are oriented transversely to the longitudinal axis of the conductor bars 20 (see also FIGS. 3a and 3b). The transverse portions may either be part of the end winding 22, as shown in FIG. 1, or part of the respective conductor bar 20.

As can be seen, in particular in FIGS. 1 and 3, the transverse portions 28 at the two end portions of the end connectors 22, which extend to the respective ends 26 of the conductor bars 20, have different lengths in order to obtain the respective relative position of the end winding 22 in the winding overhang 24. The transverse portions 28 each have a rectangular recess 28a into which the ends 26 of the conductor bars 20 are inserted and connected electrically and mechanically, e. g. by means of laser welding.

FIG. 2 schematically shows how the conductor bars 20 are joined by the end connectors 22 with their transverse portions 28 with different lengths at one end of the conductor bars 20 to form a stator coil 14.

FIG. 3a illustrates one end winding 22 with transverse portions 28 of different lengths, which is arranged in FIG. 1 at the upper end of the conductor bars 20.

FIG. 3b illustrates one end winding 22 with transverse portions 28 of the same length, which is arranged in FIG. 1 at the lower end of the conductor bars 20.

Depending on the number of phases and the number of holes of the electrical machine, the end connectors 22 span several grooves 16. Respective conductor bars 20 which are arranged in a neighbouring relationship each in one groove have conductor portions 20', 20" of different lengths, which protrude beyond the faces of the stator 10 or the rotor, respectively. In the embodiment shown in FIG. 1, the length of the conductor portions 20', 20" increases from the stator back 11 towards the free end of the teeth 18 (in other words, towards the air gap of the electrical machine). The end connectors 22 are arranged stacked above one another in an increasing order ladder-type from the stator back 11 towards the teeth 18 in a corresponding manner.

As can also be seen from FIG. 1, end connectors of a winding overlap end connectors of another winding in the lateral direction as well (in FIG. 1 e.g., from the left to the right). Thereby the end connectors 22 with the two shortest conductor bars 20n (FIG. 1 front) of one winding 14 form the lowermost layer which is superimposed by the end connectors of the following second-shortest conductor bars 20 of this winding 14 ladder-type (in FIG. 1 rearwards). This construction is repeated to the longest conductor bars 20 (rearmost in FIG. 1) of this winding 14. Between the end connectors 22 of one winding 14 the end connectors 22 of further windings 14 project in a laterally stepped manner between.

Thus, the invention provides a very compact and space-saving arrangement of the winding overhangs of the electrical machine thanks to its ladder-type increasing conductor bars in each groove and the ladder-type end connectors of a winding encompassing one another both in the longitudinal direction of the grooves as well as the end connectors of neighbouring windings penetrating one another in an imbricated manner in a direction transverse to the grooves.

The ratios of the individual parts and portions thereof shown in the figures and their material thicknesses are not to be construed as being limiting. Rather may individual dimensions deviate from the illustrated ones. Moreover, it is understood that the embodiments shown in the figures have to be arranged correspondingly about an axis of rotation or to be curved for rotating machines, i.e. internal or external rotor machines.

The invention claimed is:

1. A travelling field machine with a stator and a rotor which are separated by an air gap and each of which comprises at least one stator coil or one rotor coil, respectively, wherein the stator or the rotor, respectively, comprising:

a soft magnetic iron body with a stator back or a rotor back, respectively, in which spaced grooves are formed, generating teeth, and in each of the grooves several conductor bars of the stator coil or the rotor coil, respectively, are arranged in series comprising end connectors arranged at faces of the stator or the rotor, respectively, which connect the conductor bars extending across several grooves, wherein the conductor bars are arranged in a neighbouring relationship in each of the grooves, comprising conductor portions of different length projecting beyond the faces of the stator or rotor, respectively, and the end connectors are at least partially arranged layered in tiers in the axial direction at the faces of the stator or the rotor, respectively.

2. The travelling field machine according to claim 1, wherein the end connectors are joined at both of their ends with the ends of the conductor bars by transverse portions.

3. The travelling field machine according to claim 2, wherein the transverse portions at the ends of the end connectors to the respective ends of the conductor bars are of different lengths and/or are angled under different angles.

4. The travelling field machine according to claim 1, wherein the conductor bars have a connecting area each at their ends, which matches with corresponding portions at the end connectors for a mechanical and electrical connection.

5. The travelling field machine according to claim 4, wherein the connecting areas at the ends of the conductor bars are joined and/or welded or brazed with correspondingly shaped recesses of the transverse portions.

6. The travelling field machine according to claim 5, wherein the ends of the end connectors are integrally joined with the end portions of the conductor bar by laser welding.

7. The travelling field machine according to claim 1, wherein the grooves taper or expand towards an air gap between the stator and the rotor, and the conductor bars arranged in the grooves, depending on their position in the groove comprise a width which is at least partially adapted to the groove width.

8. The travelling field machine according to claim 1, wherein at least one of the faces of the stator are arranged in the direction of the stator back and in the direction of the air gap between the stator and the rotor, with the length of the conductor bars is increasing both from the stator back and the air gap between stator and rotor towards the centre of the grooves.

9. A stator for an electrical machine, said stator comprising:

a body including a back and first and second end faces, said body further including spaced apart grooves extending between the first and second end faces, said grooves having an open side opposite to the back;

a plurality of conductor bars positioned in and extending through the grooves so that opposite ends of the conductor bars extend outside of the body, wherein conductor bars in each groove have different lengths; and a plurality of end connectors electrically connecting the ends of predetermined conductor bars so that the different lengths of the conductor bars cause the end connectors to form a layered configuration and combine with the conductor bars to provide a stator coil.

10. The stator according to claim 9 wherein the plurality of end connectors are U-shaped members including a center portion connecting opposing leg portions.

11. The stator according to claim 10 wherein one leg portion of each end connector is longer than the other leg portion of the end connector so as to provide the layered configuration and electrically connect the proper conductor bars to form the stator coil.

12. The stator according to claim 10 wherein the plurality of end connectors have a rectangular configuration.

13. The stator according to claim 9 wherein the end connectors include a recess at opposite ends of the end connectors through which ends of the conductor bars extend to connect the end connectors to the conductor bars.

14. The stator according to claim 13 wherein the conductor bars have a square cross-sectional configuration and the recesses are square recesses.

15. The stator according to claim 13 wherein the ends of the conductor bars are welded, blazed or laser welded to the recesses.

16. The stator according to claim 9 wherein the grooves have a tapered shape such that they expand from the back of the body towards the open side of the body.

17. The stator for an electrical machine, said stator comprising:

a magnetic iron body including a back and first and second end faces, said body further including spaced apart grooves defining teeth therebetween where the grooves extend between the first and second end faces, said grooves having an open side opposite to the back;

a plurality of conductor bars having a square cross-sectional configuration positioned in and extending through the grooves so that opposite ends of the conductor bars extend outside of the body, wherein the conductor bars in each groove have different lengths and the lengths of the conductor bars get progressively longer from the back of the body towards the open side of the body; and a plurality of end connectors electrically connecting the ends of predetermined conductor bars, said end connectors being rectangular and U-shaped members including a center portion connecting opposing leg portions, wherein the leg portions include a recess for accepting ends of the conductor bars, wherein the different lengths of the conductor bars cause the end connectors to form a layered configuration and combine with the conductor bars to provide a stator coil.

18. The stator according to claim 17 wherein one leg portion of each end connector is longer than the other leg portion of the end connector.

19. The stator according to claim 17 wherein the ends of the conductor bars are welded, blazed or laser welded to the recesses.

20. The stator according to claim 17 wherein the grooves have a tapered shape such that they expand from the back of the body towards the open side of the body.

* * * * *